US011983465B2

(12) United States Patent
Azami

(10) Patent No.: US 11,983,465 B2
(45) Date of Patent: May 14, 2024

(54) INPUT ASSISTANCE SYSTEM, INPUT ASSISTANCE METHOD, AND NON-VOLATILE RECORDING MEDIUM STORING PROGRAM

(71) Applicants: Kabushiki Kaisha Toshiba, Tokyo (JP); Toshiba Digital Solutions Corporation, Kawasaki (JP)

(72) Inventor: Ryouma Azami, Kanagawa (JP)

(73) Assignees: Kabushiki Kaisha Toshiba, Tokyo (JP); Toshiba Digital Solutions Corporation, Kawasaki (JP)

(*) Notice: Subject to any disclaimer, the term of this patent is extended or adjusted under 35 U.S.C. 154(b) by 0 days.

(21) Appl. No.: 18/164,126

(22) Filed: Feb. 3, 2023

(65) Prior Publication Data

US 2023/0185525 A1 Jun. 15, 2023

Related U.S. Application Data

(63) Continuation of application No. PCT/JP2021/029175, filed on Aug. 5, 2021.

(30) Foreign Application Priority Data

Aug. 7, 2020 (JP) ................................ 2020-134972

(51) Int. Cl.
*G06F 3/16* (2006.01)
*G06F 3/04842* (2022.01)
*G10L 15/26* (2006.01)

(52) U.S. Cl.
CPC .......... *G06F 3/167* (2013.01); *G06F 3/04842* (2013.01); *G10L 15/26* (2013.01)

(58) Field of Classification Search
CPC ....... G10L 15/26; G06F 3/167; G06F 3/04842
See application file for complete search history.

(56) References Cited

U.S. PATENT DOCUMENTS 10,838,954 B1* 11/2020 Santos .................... G10L 15/22
2014/0136212 A1* 5/2014 Kwon ..................... G10L 15/22
704/275

(Continued)

FOREIGN PATENT DOCUMENTS

JP 3090341 B 12/2002
JP 2015-035099 A 2/2015

(Continued)

*Primary Examiner* — Tadesse Hailu
(74) *Attorney, Agent, or Firm* — Maier & Maier, PLLC

(57) ABSTRACT

An input assistance system includes a terminal device including a display screen, an acquisition unit, a recognition unit, an input item display unit, a recognition result display unit, and a reception unit. The acquisition unit acquires utterance voice data of a user. The recognition unit performs voice recognition of the utterance voice data to generate text data. The input item display unit displays a plurality of input items including the input item associated with the text data. The recognition result display unit displays the text data. The reception unit accepts an operation of selecting the input item associated with the text data displayed by the recognition result display unit from the plurality of input items displayed by the input item display unit. The reception unit accepts the operation of selecting the input item associated with the text data when the plurality of input items and the text data are displayed.

6 Claims, 4 Drawing Sheets

1
11 TERMINAL DEVICE
INPUT ITEM INFORMATION ACQUISITION UNIT ~11A
INPUT ITEM DISPLAY UNIT ~11B
UTTERANCE VOICE DATA ACQUISITION UNIT ~11C
RECOGNITION RESULT DISPLAY UNIT ~11D
RECOGNITION RESULT SELECTION OPERATION RECEPTION UNIT ~11E
INPUTTABLE ITEM ACTIVATION UNIT ~11F
INPUT ITEM SELECTION OPERATION RECEPTION UNIT ~11G
AUTOMATIC INPUT UNIT ~11H
12 PROCESSING SERVER
VOICE RECOGNITION UNIT ~12A
FILLER REMOVING UNIT ~12B

(56) References Cited

U.S. PATENT DOCUMENTS

| | | | | |
|---|---|---|---|---|
| 2017/0270080 | A1 | 9/2017 | Sakamoto | |
| 2018/0165581 | A1* | 6/2018 | Hwang | G06F 3/167 |
| 2018/0203845 | A1 | 7/2018 | Torii et al. | |
| 2018/0330742 | A1* | 11/2018 | Tanaka | G10L 15/26 |
| 2019/0052753 | A1* | 2/2019 | Kim | G06F 3/0487 |
| 2019/0179908 | A1* | 6/2019 | Nakao | G06F 40/51 |
| 2019/0385607 | A1* | 12/2019 | Kim | G06F 3/167 |
| 2020/0037049 | A1* | 1/2020 | Suzuki | H04N 21/8545 |
| 2020/0043490 | A1* | 2/2020 | Park | G06F 3/167 |
| 2020/0074993 | A1* | 3/2020 | Lee | G10L 15/22 |
| 2020/0125603 | A1* | 4/2020 | Ha | G06F 16/3329 |
| 2020/0135181 | A1* | 4/2020 | Anders | G06F 40/56 |
| 2020/0193994 | A1* | 6/2020 | Ahn | G10L 15/22 |
| 2020/0286467 | A1* | 9/2020 | Chao | G10L 15/005 |
| 2021/0343270 | A1* | 11/2021 | Zhang | G10L 15/08 |
| 2022/0020369 | A1* | 1/2022 | Miyazaki | G10L 15/26 |

FOREIGN PATENT DOCUMENTS

| | | | |
|---|---|---|---|
| JP | 2019-179081 | A | 10/2019 |
| JP | 6594981 | B2 | 10/2019 |
| JP | 6621151 | B2 | 12/2019 |
| JP | 2020-057401 | A | 4/2020 |

* cited by examiner

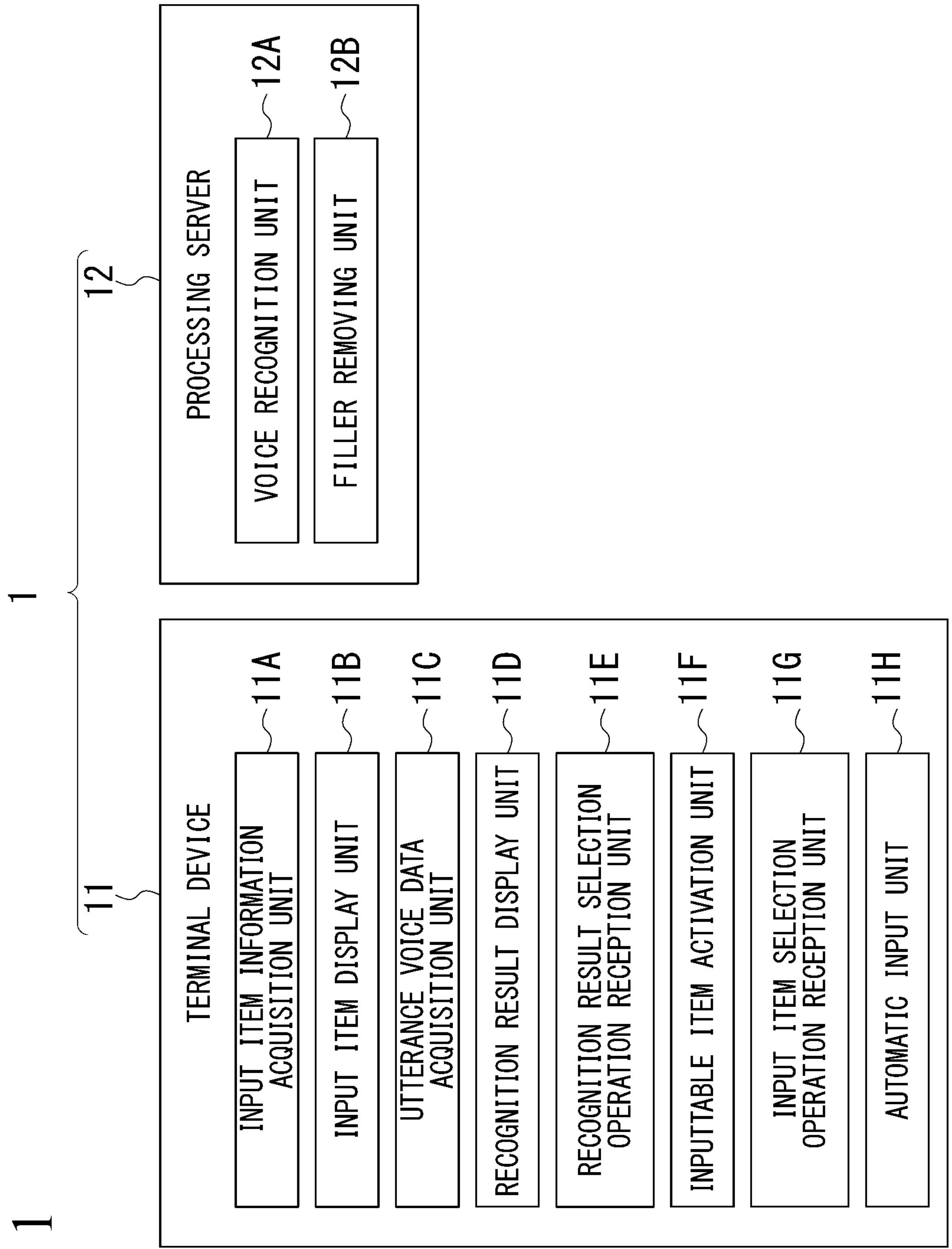
FIG. 1
1
11
TERMINAL DEVICE
INPUT ITEM INFORMATION ACQUISITION UNIT
11A
INPUT ITEM DISPLAY UNIT
11B
UTTERANCE VOICE DATA ACQUISITION UNIT
11C
RECOGNITION RESULT DISPLAY UNIT
11D
RECOGNITION RESULT SELECTION OPERATION RECEPTION UNIT
11E
INPUTTABLE ITEM ACTIVATION UNIT
11F
INPUT ITEM SELECTION OPERATION RECEPTION UNIT
11G
AUTOMATIC INPUT UNIT
11H
12
PROCESSING SERVER
VOICE RECOGNITION UNIT
12A
FILLER REMOVING UNIT
12B

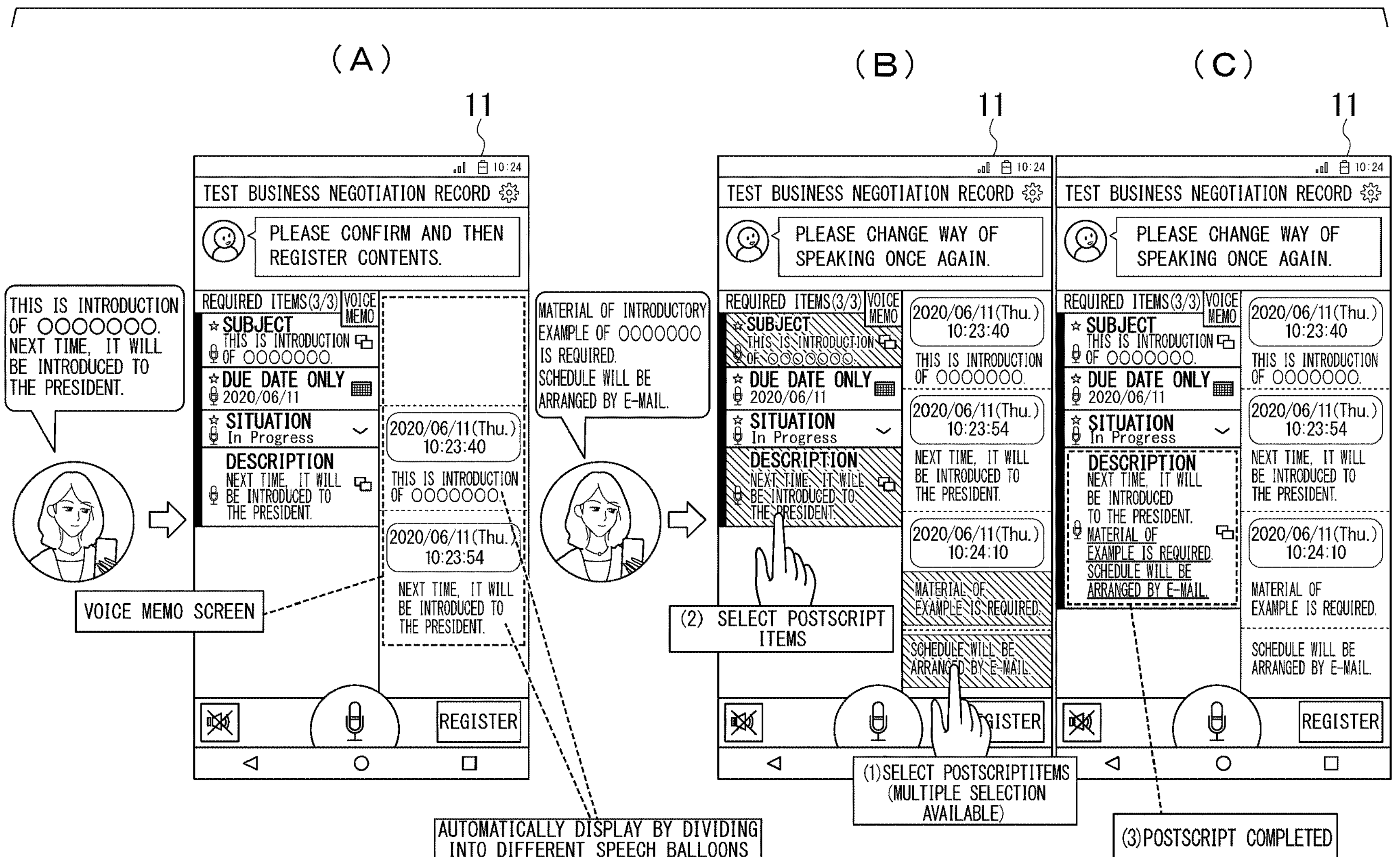
FIG. 2
(A)
(B)
(C)
11
11
11
THIS IS INTRODUCTION OF OOOOOOO. NEXT TIME, IT WILL BE INTRODUCED TO THE PRESIDENT.
TEST BUSINESS NEGOTIATION RECORD
PLEASE CONFIRM AND THEN REGISTER CONTENTS.
REQUIRED ITEMS(3/3)
VOICE MEMO
SUBJECT
THIS IS INTRODUCTION OF OOOOOOO.
DUE DATE ONLY
2020/06/11
SITUATION
In Progress
DESCRIPTION
NEXT TIME, IT WILL BE INTRODUCED TO THE PRESIDENT.
2020/06/11(Thu.) 10:23:40
THIS IS INTRODUCTION OF OOOOOOO.
2020/06/11(Thu.) 10:23:54
NEXT TIME, IT WILL BE INTRODUCED TO THE PRESIDENT.
REGISTER
VOICE MEMO SCREEN
AUTOMATICALLY DISPLAY BY DIVIDING INTO DIFFERENT SPEECH BALLOONS
MATERIAL OF INTRODUCTORY EXAMPLE OF OOOOOOO IS REQUIRED. SCHEDULE WILL BE ARRANGED BY E-MAIL.
TEST BUSINESS NEGOTIATION RECORD
PLEASE CHANGE WAY OF SPEAKING ONCE AGAIN.
REQUIRED ITEMS(3/3)
VOICE MEMO
SUBJECT
THIS IS INTRODUCTION OF OOOOOOO.
DUE DATE ONLY
2020/06/11
SITUATION
In Progress
DESCRIPTION
NEXT TIME, IT WILL BE INTRODUCED TO THE PRESIDENT.
2020/06/11(Thu.) 10:23:40
THIS IS INTRODUCTION OF OOOOOOO.
2020/06/11(Thu.) 10:23:54
NEXT TIME, IT WILL BE INTRODUCED TO THE PRESIDENT.
2020/06/11(Thu.) 10:24:10
MATERIAL OF EXAMPLE IS REQUIRED.
SCHEDULE WILL BE ARRANGED BY E-MAIL.
(2) SELECT POSTSCRIPT ITEMS
(1)SELECT POSTSCRIPTITEMS (MULTIPLE SELECTION AVAILABLE)
TEST BUSINESS NEGOTIATION RECORD
PLEASE CHANGE WAY OF SPEAKING ONCE AGAIN.
REQUIRED ITEMS(3/3)
VOICE MEMO
SUBJECT
THIS IS INTRODUCTION OF OOOOOOO.
DUE DATE ONLY
2020/06/11
SITUATION
In Progress
DESCRIPTION
NEXT TIME, IT WILL BE INTRODUCED TO THE PRESIDENT. MATERIAL OF EXAMPLE IS REQUIRED. SCHEDULE WILL BE ARRANGED BY E-MAIL.
2020/06/11(Thu.) 10:23:40
THIS IS INTRODUCTION OF OOOOOOO.
2020/06/11(Thu.) 10:23:54
NEXT TIME, IT WILL BE INTRODUCED TO THE PRESIDENT.
2020/06/11(Thu.) 10:24:10
MATERIAL OF EXAMPLE IS REQUIRED.
SCHEDULE WILL BE ARRANGED BY E-MAIL.
REGISTER
(3)POSTSCRIPT COMPLETED

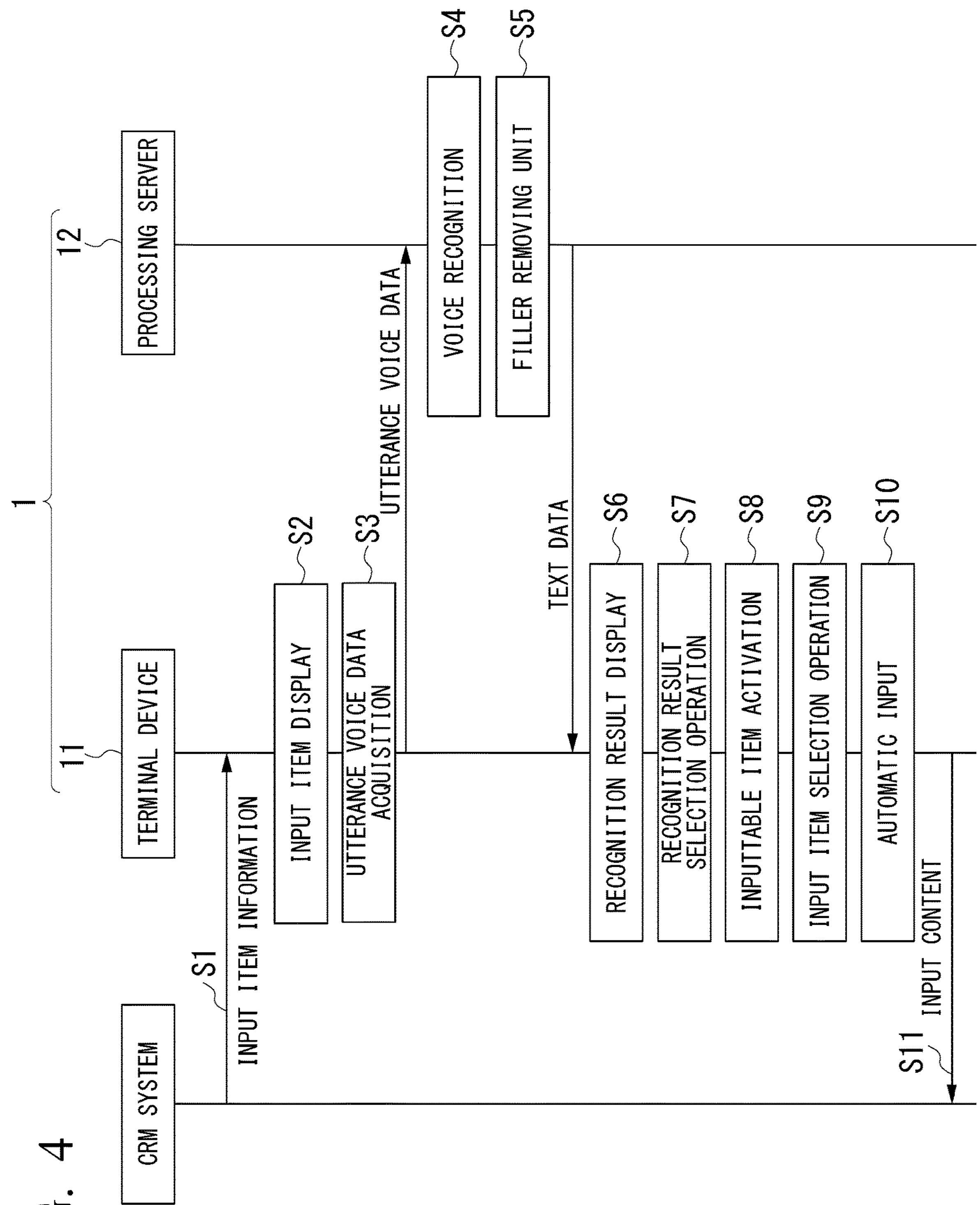
FIG. 4
1
CRM SYSTEM
11
TERMINAL DEVICE
12
PROCESSING SERVER
S1
INPUT ITEM INFORMATION
S2
INPUT ITEM DISPLAY
S3
UTTERANCE VOICE DATA ACQUISITION
UTTERANCE VOICE DATA
S4
VOICE RECOGNITION
S5
FILLER REMOVING UNIT
TEXT DATA
S6
RECOGNITION RESULT DISPLAY
S7
RECOGNITION RESULT SELECTION OPERATION
S8
INPUTTABLE ITEM ACTIVATION
S9
INPUT ITEM SELECTION OPERATION
S10
AUTOMATIC INPUT
S11
INPUT CONTENT

INPUT ASSISTANCE SYSTEM, INPUT ASSISTANCE METHOD, AND NON-VOLATILE RECORDING MEDIUM STORING PROGRAM

This application is a continuation of PCT International Application No. PCT/JP2021/029175, filed Aug. 5, 2021, and based upon and claims the benefit of priority from Japanese Patent Application No. 2020-134972, filed Aug. 7, 2020. The entire contents of the PCT International Application and the Japanese Patent Application are incorporated herein by reference.

FIELD

Embodiments of the present disclosure relate to an input assistance system, an input assistance method, and a non-volatile recording medium storing a program.

BACKGROUND

Conventionally, an assistance to an information input by the user has been performed. For example, voice recognition processing is performed on the voice digital data corresponding to the content spoken by the user, and text data converted from the voice digital data is generated.

It is necessary for the user to input (store) the text data generated by the information processing device in association with any item among a plurality of items.

According to the prior art, the assistance for inputting (storing) the text data generated by the information processing device in association with any item among the plurality of items is not performed.

Accordingly, according to the prior art, there is a case in which the user may wonder that the text data generated by the information processing device should be input (stored) in association with which item. That is, there is a case in which the user cannot easily perform the input operation.

Conventionally, it has been performed to assist the information transmission during an emergency transportation. For example, the conversational voice made during the emergency transportation is recognized and converted into the text data.

According to the prior art, the process of associating the text data generated by the information processing device with any item among the plurality of items is performed by the information processing device rather than the requester (that is, the human) of the emergency acceptance such as a concerned person or the like, for example, an emergency worker, the patient himself, the family member of the patient or the like.

Accordingly, there is a case in which the text data generated by the information processing device is associated with an item that is not intended by the requester of the emergency acceptance.

According to the prior art, the process of associating the text data with any item among the plurality of items is not performed by a human such that it is necessary to improve the simplicity of the human operation for associating the text data with any item among the plurality of items.

BRIEF DESCRIPTION OF DRAWINGS

FIG. 1 is a view showing an example of a configuration of an input assistance system according to a first embodiment.

FIG. 2 is a view showing an example of a display screen on a terminal device of the input assistance system of the input assistance system according to the first embodiment.

FIG. 4 is a view showing a sequence for describing an example of processing that is executed by the input assistance system according to the first embodiment in the example shown in FIG. 3.

DETAILED DESCRIPTION

Figure 3:
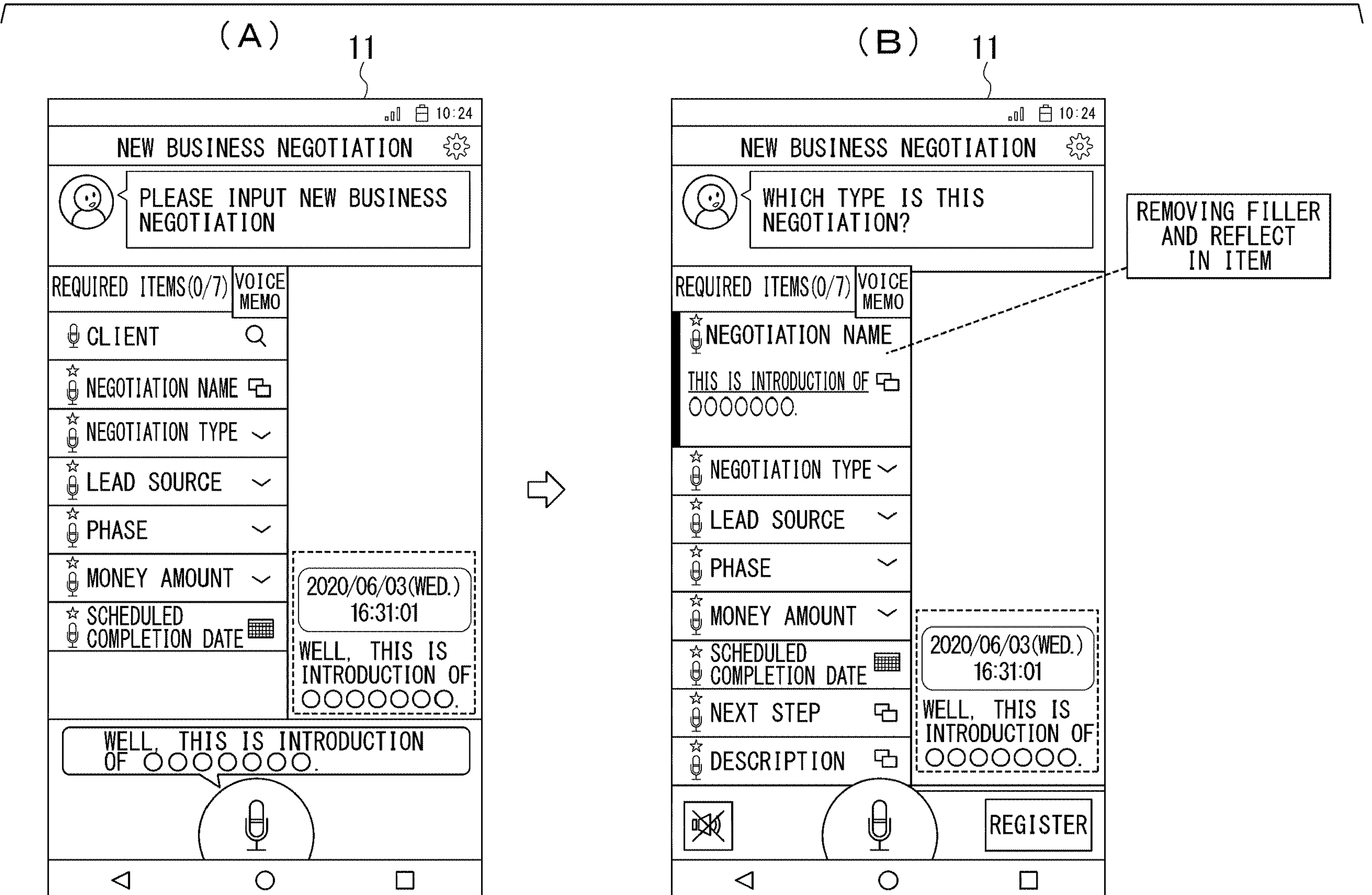
FIG. 3 is a view showing another example of the display screen on the terminal device of the input assistance system according to the first embodiment.

Hereinafter, an input assistance system, an input assistance method, and a non-volatile recording medium storing a program according to an embodiment will be described with reference to the drawings.

First Embodiment

FIG. 1 is a view showing an example of a configuration of an input assistance system 1 according to the first embodiment.

In the example shown in FIG. 1, the input assistance system 1 includes a terminal device 11 and a processing server 12. The terminal device 11 and the processing server 12 are configured to be communicable with each other via, for example, a network (not shown).

The terminal device 11 includes an input item information acquisition unit 11A, an input item display unit 11B, an utterance voice data acquisition unit 11C, a recognition result display unit 11D, a recognition result selection operation reception unit 11E, and an inputtable item activation unit 11F, an input item selection operation reception unit 11G, and an automatic input unit 11H.

The input item information acquisition unit 11A acquires the input item information from, for example, the outside of the input assistance system 1. The input item information is the information related to an item (input item) associated with the information (text data) that is input (stored) by using the input assistance system 1. The input item information includes the information relating to an item name, the information relating to an input format, and the like.

The input item display unit 11B displays a plurality of input items including an input item associated with the text data that is input (stored) by using the input assistance system 1 on the display screen of the terminal device 11.

The utterance voice data acquisition unit 11C acquires the utterance voice data indicating the utterance voice of the user of the input assistance system 1.

In the example shown in FIG. 1, a function of converting the utterance voice of the user of the input assistance system 1 into utterance voice data (for example, the digital data) is provided in the terminal device 11. In another example, for example, in an example in which an IC recorder is used in addition to the terminal device 11, the function of converting the utterance voice of the user of the input assistance system 1 into utterance voice data may not provided in the terminal device 11. In this example, the utterance voice of the user of the input assistance system 1 is converted into the utterance voice data outside the terminal device 11, and the utterance voice data acquisition unit 11C acquires the utterance voice data from the outside of the terminal device 11.

In the example shown in FIG. 1, the processing server 12 includes a voice recognition unit 12A and a filler removing unit 12B. The voice recognition unit 12A recognizes the utterance voice data acquired by the utterance voice data acquisition unit 11C and generates the text data. In other words, the voice recognition unit 12A converts the utterance voice data acquired by the utterance voice data acquisition unit 11C into the text data.

The filler removing unit 12B detects the filler included in the utterance voice of the user indicated by the utterance voice data acquired by the utterance voice data acquisition unit 11C, for example, "um", "eh", "ah", "umm", "that" and the like (including the voiced pause). When the filler is detected, the filler removing unit 12B removes the text data corresponding to the filler from the text data generated by the voice recognition unit 12A.

In the example shown in FIG. 1, the voice recognition unit 12A and the filler removing unit 12B are provided in the processing server 12 that is provided independently from the terminal device 11. In another example, the processing server 12 is not be provided, and the voice recognition unit 12A and the filler removing unit 12B may be provided in the terminal device 11. In a further example, the voice recognition unit 12A and the filler removing unit 12B may be provided in a plurality of different servers.

In the example shown in FIG. 1, the recognition result display unit 11D displays the text data generated by the voice recognition unit 12A on the display screen of the terminal device 11 as the recognition result by the voice recognition unit 12A.

The input item selection operation reception unit 11G accepts an operation of selecting an input item associated with the text data displayed by the recognition result display unit 11D from a plurality of input items displayed by the input item display unit 11B. Specifically, the text data displayed by the recognition result display unit 11D is the text data selected by the operation received by the recognition result selection operation reception unit 11E.

Further, the above-mentioned input item display unit 11B displays the plurality of input items on a part of the display screen of the terminal device 11. The recognition result display unit 11D described above displays the text data generated by the voice recognition unit 12A on another part of the display screen of the terminal device 11. The input item selection operation reception unit 11G accepts the operation of selecting the input item associated with the text data generated by the voice recognition unit 12A in a state in which the input item display unit 11B displays the plurality of input items on the display screen of the terminal device 11, and the recognition result display unit 11D displays the text data generated by the voice recognition unit 12A on the display screen of the terminal device 11.

Accordingly, in the example shown in FIG. 1, it is easy for the user of the input assistance system 1 to perform the operations of checking the plurality of input items and the text data displayed on the display screen of the terminal device 11 while selecting the input item associated with the text data from the plurality of input items.

The voice spoken by the user may include a silent section.

In the example shown in FIG. 1, in a case in which the silent section is included in the utterance voice of the user indicated by the utterance voice data acquired by the utterance voice data acquisition unit 11C, the voice recognition unit 12A generates pre-silent-section text data and post-silent-section text data. The pre-silent-section text data is text data corresponding to the part before the silent section in the utterance voice data acquired by the utterance voice data acquisition unit 11C. The post-silence-section text data is text data corresponding to the part after the silence section in the utterance voice data acquired by the utterance voice data acquisition unit 11C.

The recognition result display unit 11D displays the pre-silent-section text data and post-silent-section text data generated by the voice recognition unit 12A.

The recognition result selection operation reception unit 11E selects and accepts the operation of selecting the text data corresponding to the input item that is selected by the reception operation by the input item selection operation reception unit 11G from the pre-silent-section text data and post-silent-section text data that is displayed by the recognition result display unit 11D.

Accordingly, in the example shown in FIG. 1, it is easy for the user of the input assistance system 1 to perform the operation of associating the multiple text data that is divided by the silent section with the plurality of input items respectively by executing the operation with respect to the recognition result selection operation reception unit 11E by multiple times.

For example, the silent section is included in the utterance voice data by turning off a voice input button (button of microphone). In other words, in this example, the utterance voice data is manually divided by the user into the pre-silent-section text data and the post-silent-section text data.

In another example, for example, the pre-silent-section text data and the post-silent-section text data may be manually divided by the administrator or the like of the input assistance system 1.

In a further example, the input assistance system 1 may have a function of determining the division of the utterance voice data in the context, and the input assistance system may automatically divide the utterance voice data into the pre-silent-section text data and the post-silent-section text data.

In the example shown in FIG. 1, the inputtable item activation unit 11F activates the display of a candidate input item as the input item that can be associated with the text data that is selected by the operation accepted by the recognition result selection operation reception unit 11E among the plurality of input items displayed by the input item display unit 11B.

Accordingly, in the example shown in FIG. 1, it is easy for the user of the input assistance system 1 to understand the input item that can be associated with the text data displayed on the recognition result display unit 11D by confirming the candidate input item displayed on the display screen of the activated terminal device 11.

In the example shown in FIG. 1, the automatic input unit 11H executes the association between the text data that is selected by the operation accepted by the recognition result selection operation reception unit 11E and the input item that is selected by the operation accepted by the input item selection operation reception unit 11G. The automatic input unit 11H executes the operation of including the text data that is selected by the operation accepted by the recognition result selection operation reception unit 11E into the display field of the input item that is selected by the operation accepted by the input item selection operation reception unit 11G (that is, the display field of the selected input item on the display screen of the terminal device 11).

Specifically, in a case in which a filler is included in the utterance voice of user indicated by the utterance voice data acquired by the utterance voice data acquisition unit 11C, the automatic input unit 11H executes the processing of including the post-filler-removing text data into the display field of the input item that is selected by the operation accepted by the input item selection operation reception unit 11G. The post-filler-removing text data is the text data after the text data corresponding to the filler is removed by the filler removing unit 12B.

On the other hand, in a case in which a filler is included in the utterance voice of user indicated by the utterance voice data acquired by the utterance voice data acquisition unit 11C, the recognition result display unit 11D displays the pre-filler-removing text data on the display screen of the terminal device 11. The pre-filler-removing text data is the text data before the text data corresponding to the filler is removed by the filler removing unit 12B.

Accordingly, in the example shown in FIG. 1, it is easy for the user of the input assistance system 1 to grasp whether or not the filler is contained in the utterance voice of himself/herself by confirming the pre-filler-removing text data displayed by the recognition result display unit 11D.

It is easy for the user of the input assistance system 1 to grasp whether or not the text data corresponding to the filler included in the utterance voice of himself/herself has been removed by confirming the pre-filler-removing text data displayed by the recognition result display unit 11D and the post-filler-removing text data included in the display field of the input item by the automatic input unit 11H.

FIG. 2 is a view showing an example of the display screen of the terminal device 11 of the input assistance system 1 according to the first embodiment.

In the example shown in FIG. 2, the terminal device 11 of the input assistance system 1 according to the first embodiment is used for inputting a negotiation record.

At the stage shown in the part (A) of FIG. 2, the utterance voice data acquisition unit 11C (see FIG. 1) of the terminal device 11 acquires the utterance voice data indicating "This is the introduction of 0000000. Next time, it will be introduced to the president." as the utterance voice of the user of the input assistance system 1.

The voice recognition unit 12A (see FIG. 1) of the processing server 12 (see FIG. 1) recognizes the utterance voice data acquired by the utterance voice data acquisition unit 11C and generates the text data.

Specifically, in the example shown in the part (A) of FIG. 2, the utterance voice by the user of the input assistance system 1 includes a silent section. The voice recognition unit 12A generates the pre-silent-section text data "This is the introduction of 0000000." and the post-silent-section text data "Next time, it will be introduced to the president.". The pre-silent-section text data is the text data corresponding to the part of the utterance voice before the silent section that is acquired by the utterance voice data acquisition unit 11C. The post-silent-section text data is the text data corresponding to the part of the utterance voice after the silent section that is acquired by the utterance voice data acquisition unit 11C.

The recognition result display unit 11D (see FIG. 1) of the terminal device 11 displays the pre-silent-section text data "This is the introduction of 0000000." and the post-silent-section text data "Next time, it will be introduced to the president." generated by the voice recognition unit 12A on the part at the right side of the display screen of the terminal device 11 (the part shown as "VOICE MEMO SCREEN" in the part (A) of FIG. 2). Specifically, the recognition result display unit 11D displays the pre-silent-section text data "This is the introduction of OOOOOOO." including a time stamp as "2020/06/11 (Thu.) 10:23:40" on the part at the right side of the display screen of the terminal device 11 and the post-silent-section text data "Next time, it will be introduced to the president." including a time stamp as "2020/06/11 (Thursday) 10:23:54" on the part at the right side of the display screen of the terminal device 11.

At the stage shown in the part (A) of FIG. 2, the recognition result selection operation reception unit 11E (see FIG. 1) of the terminal device 11 accepts the operation of selecting the text data "This is the introduction of OOOOOOO." corresponding to the input item "subject" from the pre-silent-section text data "This is the introduction of OOOOOOO." and the post-silent-section text data "Next time, it will be introduced to the president." displayed on the part at the right side of the display screen of the terminal device 11 by the recognition result display unit 11D. The input item "subject" is selected by the operation accepted by the input item selection operation reception unit 11G (see FIG. 1).

The input item display unit 11B (see FIG. 1) of the terminal device 11 displays a plurality of input items as "subject", "due date only", "situation", and "description" including the input item "subject" corresponding to the text data "This is the introduction of OOOOOOO." that is input (stored) by using the input assistance system 1 on the part at the left side of the display screen of the terminal device 11.

The input item selection operation reception unit 11G of the terminal device 11 accepts the operation of the user of the input assistance system 1 selecting the input item "subject" from the plurality of input items as "subject", "due date only", "situation", and "description" that are displayed on the part at the left side of the display screen of the terminal device 11 by the input item display unit 11B. The input item "subject" corresponds to the text data "This is the introduction of OOOOOOO." that is displayed on the part at the right side of the display screen of the terminal device 11 by the recognition result display unit 11D.

As a result, the automatic input unit 11H (see FIG. 1) of the terminal device 11 executes the association of the text data "This is the introduction of OOOOOOO." that is selected by the operation accepted by the recognition result selection operation reception unit 11E and the input item "subject" that is selected by the operation accepted by the input item selection operation reception unit 11G. The automatic input unit 11H executes the processing of including the text data "This is the introduction of OOOOOOO." that is selected by the operation accepted by the recognition result selection operation reception unit 11E into the display field of the input item "subject" that is selected by the operation accepted by the input item selection operation reception unit 11G.

Furthermore, at the stage shown in the part (A) of FIG. 2, the recognition result selection operation reception unit 11E of the terminal device 11 accepts the operation of selecting the text data "Next time, it will be introduced to the president." from the pre-silent-section text data "This is the introduction of OOOOOOO." And the post-silent-section text data "Next time, it will be introduced to the president." that are displayed on the part at the right side of the display screen of the terminal device 11 by the recognition result display unit 11D. The text data "Next time, it will be introduced to the president." is associated with the input item "description" that is selected by the operation accepted by the input item selection operation reception unit 11G.

The input item display unit 11B of the terminal device 11 is displaying the plurality of input items as "subject", "due date only", "situation", and "description" that are displayed on the part at the left side of the display screen of the terminal device 11 including the input item "description" that is associated with the text data "Next time, it will be introduced to the president." that is input (stored) by using the input assistance system 1.

The input item selection operation reception unit 11G of the terminal device 11 accepts the operation of the user of the input assistance system 1 of selecting the input item "description" from the plurality of input items as "subject", "due date only", "situation", and "description" that are displayed on the part at the left side of the display screen of the terminal device 11 by the input item display unit 11B. The input item "description" is associated with the text data "Next time, it will be introduced to the president." that is displayed on the part at the right side of the display screen of the terminal device 11 by the recognition result display unit 11D.

Accordingly, the automatic input unit 11H of the terminal device 11 executes the association of the text data "Next time, it will be introduced to the president." that is selected by the operation accepted by the recognition result selection operation reception unit 11E and the input item "description" that is selected by the operation accepted by the input item selection operation reception unit 11G. The automatic input unit 11H executes the processing of including the text data "Next time, it will be introduced to the president." that is selected by the operation accepted by the recognition result selection operation reception unit 11E into the display field of the input item "description" that is selected by the operation accepted by the input item selection operation reception unit 11G.

As a result, the display screen of the terminal device 11 enters the state as shown in the part (A) of FIG. 2.

Next, at the stage shown in the part (B) of FIG. 2, the utterance voice data acquisition unit 11C of the terminal device 11 acquires the utterance voice data indicating the utterance voice "The material of introductory example is required. The schedule will be arranged by e-mail." Of the user of the input assistance system 1.

The voice recognition unit 12A of the processing server 12 voice-recognizes the utterance voice data acquired by the utterance voice data acquisition unit 11C and generates the text data.

Specifically, in the example shown in the part (B) of FIG. 2, the utterance voice of the user of the input assistance system 1 includes the silent section. The voice recognition unit 12A generates the pre-silent-section text data "The material of introductory example is required." and the post-silent-section text data "The schedule will be arranged by e-mail.". The pre-silent-section text data is the text data corresponding to the part of the utterance voice data before the silent section that is acquired by the utterance voice data acquisition unit 11C before. The post-silence section text data is the text data corresponding to the part of the utterance voice data after the silent section that is acquired by the utterance voice data acquisition unit 11C.

The recognition result display unit 11D of the terminal device 11 displays the pre-silent-section text data "The material of introductory example is required." and the post-silent-section text data "The schedule will be arranged by e-mail." that is generated by the voice recognition unit 12A on the part at the right side of the display screen of the terminal device 11. Specifically, the recognition result display unit 11D of the terminal device 11 displays the pre-silent-section text data "The material of introductory example is required." and the post-silent-section text data "The schedule will be arranged by e-mail." including the time stamp "2020/06/11 (Thu.) 10:24:10" on the part at the right side of the display screen of the terminal device 11.

In the example shown in the part (B) of FIG. 2, the text data is divided into two text data (the pre-silent-section text data "The material of introductory example is required." and the post-silent-section text data "The schedule will be arranged by e-mail.") by the silent section, and the two text data is displayed on the part at the right side of the display screen of the terminal device 11. In another example, the text data may be divided into (n+1) text data by a number of n silent sections (in the example of n=2, there is three of text data "The material of introductory example is required.", "It is necessary to consult with Mr. OO with detailed materials.", and "The schedule will be arranged by e-mail."), and the (n+1) text data may be displayed on the part at the right side of the display screen of the terminal device 11.

At the stage shown in the part (B) of FIG. 2, as shown in "(1) select postscript items (multiple selection available)", the recognition result selection operation reception unit 11E of the terminal device 11 accepts the operation of selecting the text data "The material of introductory example is required." and the text data "The schedule will be arranged by e-mail." corresponding to the input item "description" that is selected by the operation accepted by the input item selection operation reception unit 11G from the pre-silent-section text data "The material of introductory example is required." and the post-silent-section text data "The schedule will be arranged by e-mail.". The pre-silent-section text data "The material of introductory example is required." and the post-silent-section text data "The schedule will be arranged by e-mail." are displayed on the part at the right side of the display screen of the terminal device 11 by the recognition result display unit 11D.

That is, in the example shown in the part (B) of FIG. 2, the operation of selecting two postscript items (the text data "The material of introductory example is required." and the text data "The schedule will be arranged by e-mail.") is accepted by the recognition result selection operation reception unit 11E.

At the stage shown in the part (B) of FIG. 2, the input item display unit 11B of the terminal device 11 displays the plurality of input items "subject", "due data only", "situation", and "description" including the input item "description" associated with the text data "The material of introductory example is required." and the text data "The schedule will be arranged by e-mail." that are input (stored) by using the input assistance system 1 on the part at the left side of the display screen of the terminal device 1.

As shown in "(2) select postscript items" in the part (B) of FIG. 2, the input item selection operation reception unit 11G of the terminal device 11 accepts the operation of the user of the input assistance system 1 for selecting the input item "description" from the plurality of input items "subject", "due date only", "situation", and "description" that are displayed on the part at the left side of the display screen of the terminal device 1 by the input item display unit 11B. The input item "description" is associated with the text data "The material of introductory example is required." and the text data "The schedule will be arranged by e-mail." That are displayed on the part at the right side of the display screen of the terminal device 11 by the recognition result display unit 11D.

That is, it is in the state in which the plurality of input items "subject", "due date only", "situation", and "description" are displayed on the part at the left side of the display screen of the terminal device 11 by the input item display unit 11B, and the text data "The material of introductory example is required." and the text data "The schedule will be arranged by e-mail" is displayed on the part at the right side of the display screen of the terminal device 11. In this state, the input item selection operation reception unit 11G accepts the operation of the user of the input assistance system 1 for selecting the input item "description" associated with the text data "The material of introductory example is required." and the text data "The schedule will be arranged by e-mail.".

Specifically, at the stage shown in the part (B) of FIG. 2, the inputtable item activation unit 11F activates the display of the input items "subject" and "description" among the plurality of input items "subject", "due data only", "situation", and "description" that are displayed on the part at the left side of the display screen of the terminal device 11 by the input item display unit 11B as the candidate input items that can be associated with the text data "The material of introductory example is required." and the text data "The schedule will be arranged by e-mail." that are displayed on the part at the right side of the display screen of the terminal device 11 by the recognition result display unit 11D.

In the example shown in the part (B) of FIG. 2, the input item selection operation reception unit 11G accepts the operation of the user of the input assistance system 1 for selecting the input item "description" from the candidate input items "subject" and "description".

As a result, as shown in the part (C) of FIG. 2, the automatic input unit 11H of the terminal device 11 executes the association of the text data "The material of introductory example is required." and the text data "The schedule will be arranged by e-mail." that are selected by the operations accepted by the recognition result selection operation reception unit 11E and the input item "description" that is selected by the operation accepted by the input item selection operation reception unit 11G. As shown in "(3) postscript completed" in the part (C) of FIG. 2, the automatic input unit 11H executes the processing of including (more specifically, appending) the text data "The material of introductory example is required." and the text data "The schedule will be arranged by e-mail." that are selected by the operations accepted by the recognition result selection operation reception unit 11E into the display field of the input item "description" that is selected by the operation accepted by the input item selection operation reception unit 11G.

In the example shown in FIG. 2, the display field of the input item "description" is a free-description type that the arbitrary text data can be included. On the other hand, the display field of the input item "situation" is an optional type in which one option as "in progress" among a plurality of options displayed is selected by the user tapping the mark "V".

In this manner, when the text data is selected, the item into which the selected text data is inputtable is determined as the associable input item based on the type (text type, numerical type or the like) to which the input item is associable and the candidate input item is activated. The activation based on the type to which the input item is associated is shown above; however, the present disclosure is not limited to this configuration, in a case in which the name of the input item is the same with or similar to the character string that should be input into the item and has been associated in advance, the reading of the character string included in the selected text data may be activated as the candidate input item.

The user who reports a business negotiation using the terminal device 11 often inputs necessary information by voice between business operations in advance and creates report data by using the input information later.

In the example shown in FIG. 2, a function for temporarily storing the voice recognition result is added as described above. Therefore, the user of the input assistance system 1 selects the stored voice memo (that is, by selecting the text data displayed on the part at the right side of the display screen of the terminal device 11) such that it is possible to add the text data to the input item displayed on the part at the left side of the display screen of the terminal device 11.

FIG. 3 is a view showing another example of the display screen of the terminal device 11 of the input assistance system 1 according to the first embodiment.

In the example shown in FIG. 3, the terminal device 11 of the input assistance system 1 according to the first embodiment is used for inputting a new business negotiation.

At the stage shown in the part (A) of FIG. 3, the utterance voice data acquisition unit 11C of the terminal device 11 acquires the utterance voice data indicating the utterance voice "Well, this is introduction of OOOOOOOO." Of the user of the input assistance system 1.

The voice recognition unit 12A of the processing server 12 voice-recognizes the utterance voice data acquired by the utterance voice data acquisition unit 11C and generates the text data.

In detail, in the example shown in the part (A) of FIG. 3, the filler is included in the utterance voice "Well, this is introduction of OOOOOOOO." indicated by the utterance voice data acquired by the utterance voice data acquisition unit 11C. Accordingly, the filler removing unit 12B (see FIG. 1) of the processing server 12 detects the filler included in the utterance voice "Well, this is introduction of OOOOOOOO." of the user indicated by the utterance voice data acquired by the utterance voice data acquisition unit 11C. The filler removing unit 12B removes the text data "well" corresponding to the filler from the text data "Well, this is introduction of OOOOOOOO." generated by the voice recognition unit 12A.

The recognition result display unit 11D of the terminal device 11 displays the text data "Well, this is introduction of OOOOOOOO." generated by the voice recognition unit 12A on the part at the right side of the display screen of the terminal device 11.

That is, the recognition result display unit 11D displays the pre-filler-removing text data "Well, this is introduction of OOOOOOOO." on the part at the right side of the display screen of the terminal device 11. The pre-filler-removing text data "Well, this is introduction of OOOOOOOO." is the text before the text "well" corresponding to the filler included in the utterance voice "Well, this is introduction of OOOOOOOO." Of the user is removed by the filler removing unit 12B. The utterance voice "Well, this is introduction of OOOOOOOO." is indicated by the utterance voice data acquired by the utterance voice data acquisition unit 11C.

Next, at the stage shown in the part (B) of FIG. 3, the recognition result selection operation reception unit 11E of the terminal device 11 accepts the operation of selecting the text data "Well, this is introduction of OOOOOOOO." that is shown in the part at the right side of the display screen of the terminal device 11 by the recognition result display unit 11D as the text data that can be associated with the input item "negotiation name" that is selected by the operation accepted by the input item selection operation reception unit 11G.

The input item display unit 11B of the terminal device 11 displays the plurality of input items "client", "negotiation name", "negotiation type", "lead source", "phase", "money amount", "scheduled completion date", "next step", and "description" including the input item "negotiation name" that is associated with the text data "this is introduction of OOOOOOOO." that is input (stored) by using the input assistance system 1 in the part at the left side of the display screen of the terminal device 11.

The input item selection operation reception unit 11G of the terminal device 11 accepts the operation of the user of the input assistance system 1 for selecting the input item “negotiation name” from the plurality of input items “client”, “negotiation name”, “negotiation type”, “lead source”, “phase”, “money amount”, “scheduled completion date”, “next step”, and “description”. The plurality of input items “client”, “negotiation name”, “negotiation type”, “lead source”, “phase”, “money amount”, “scheduled completion date”, “next step”, and “description” are displayed in the part at the left side of the display screen of the terminal device 11 by the input item display unit 11B. The input item “negotiation name” is associated with the text data “Well, this is introduction of OOOOOOOO.” that is displayed in the part at the right side of the display screen of the terminal device 11 by the recognition result display unit 11D.

As a result, the automatic input unit 11H of the terminal device 11 executes the association of the text data “Well, this is introduction of OOOOOOOO.” that is selected by the operation accepted by the recognition result selection operation reception unit 11E with the input item “negotiation name” selected by the operation accepted by the input item selection operation reception unit 11G.

The automatic input unit 11H executes the processing of including the text data “Well, this is introduction of OOOOOOOO.” that is selected by the operation accepted by the recognition result selection operation reception unit 11E into the display field of the of the input item “subject” that is selected by the operation accepted by the input item selection operation reception unit 11G.

In detail, the filler is included in the utterance voice “Well, this is introduction of OOOOOOOO.” of the user that is indicated by the utterance voice data acquired by the utterance voice data acquisition unit 11C. Accordingly, the automatic input unit 11H executes the processing of including the post-filler-removing text data “this is introduction of OOOOOOOO.” into the display field of the input item “negotiation name” selected by the operation accepted by the input item selection operation reception unit 11G. The post-filler-removing text data “this is introduction of OOOOOOOO.” is the text data after removing the filler associated with the text data “well” by the filler removing unit 12B.

That is, in the example shown in FIG. 3, the function of removing the filler included in the voice recognition result and reflecting it in the input item is added. Therefore, the user of the input assistance system 1 can use the input assistance system 1 with a sense of security that his/her utterance voice includes the filler.

FIG. 4 is a sequence view for explaining an example of the processing executed by the input assistance system 1 according to the first embodiment in the example shown in FIG. 3.

In the example shown in FIG. 4, in step S1, the input item information acquisition unit 11A of the terminal device 11 acquires the input item information from, for example, an external CRM (Customer Relationship Management) system of the input assistance system 1. The input item information is information related to an item (input item) associated with the information (text data) input (stored) using the input assistance system 1.

For example, a plurality of types of report templates are prepared in advance in the CRM system, and a report template (input item information) selected according to the type of business of the customer (user of the input assistance system 1) is acquired by the input item information acquisition unit 11A. In another example, the input item information acquisition unit 11A may automatically call out the corresponding input item information (template) based on the voice-recognized text data. In this example, the acquisition of the input item information by the input item information acquisition unit 11A is executed after the voice recognition. In this example, the more the content that is voice-recognized (that is, the content of the remark by the user), the larger the number of the items included in the input item information (template) acquired by the input item information acquisition unit 11A is.

Next, in step S2, the input item display unit 11B of the terminal device 11 displays the plurality of input items including the input item associated with the text data input (stored) by using the input assistance system 1 in the part at the left side of the display screen of the terminal device 11.

Next, in step S3, the utterance voice data acquisition unit 11C of the terminal device 11 acquires the utterance voice data indicating the utterance voice of the user of the input assistance system 1 and then uploads the utterance voice data to the processing server 12.

Next, in step S4, the voice recognition unit 12A of the processing server 12 voice-recognizes the utterance voice data acquired in step S3 to generate the text data.

Next, in step S5, the filler removing unit 12B of the processing server 12 detects the filler included in the utterance voice of the user indicated by the utterance voice data acquired in step S3, and removes the text data corresponding to the filler from the text data generated in step S4.

Next, in step S6, the recognition result display unit 11D of the terminal device 11 displays the text data generated in step S4 in the part at the right side of the display screen of the terminal device 11 as the recognition result by the voice recognition unit 12A.

Next, in step S7, the recognition result selection operation reception unit 11E of the terminal device 11 accepts the operation of selecting the text data associated with the input item selected by the operation accepted by the input item selection operation reception unit 11G of the terminal device 11 from the text data displayed in step S6.

Next, in step S8, the inputtable item activation unit 11F of the terminal device 11 activates the display of the candidate input item as the input item that can be associated with the text data selected by the operation accepted in step S7 from the plurality of input items displayed in step S2.

Next, in step S9, the input item selection operation reception unit 11G of the terminal device 11 accepts the operation of selecting the input item that is associated with the text data selected by the operation accepted in step S7 from the plurality of input items displayed in step S2.

That is, in step S9, the input item selection operation reception unit 11G accepts the operation of selecting the input item that is associated with the text data generated in step S4 in the state in which the plurality of input items are displayed and the text data generated in step S4 is displayed.

Next, in step S10, the automatic input unit 11H of the terminal device 11 executes the association between the text data selected by the operation accepted in step S7 and the input item selected by the operation accepted in step S9.

In step S10, the automatic input unit 11H executes the processing of including the text data selected by the operation accepted in step S7 in the display field (that is, the display field of the input item selected on the display screen of the terminal device) that is selected by the operation accepted in step S9.

Next, in step S11, the terminal device 11 executes the processing of storing (registering in the CRM system) the contents input to the terminal device 11 (contents displayed on the display screen of the terminal device 11).

In the examples shown in FIG. 3 and FIG. 4, after the utterance voice data acquisition unit 11C acquires the utterance voice data and the voice recognition unit 12A generates the text data, the filler removing unit 12B removes the text data corresponding to the filler included in the utterance voice. In another example, the filler removing unit 12B may remove the filler by communicating with the processing server 12 at the time of inputting to the input item. For example, when inputting to the input item, the place where the filler of the corresponding text data is determined may be displayed, and it is possible for the user to select whether or not to remove the filler.

Many companies are promoting the registration of interactions such as visit records of the sales staff of the own company in a dedicated CRM system for the purpose of maintaining relationships with customers.

However, in many cases, registering all the interactions with the customers as a daily business is a burden for the sales person who performs the inputting, and it is difficult to collect sufficient data.

Recently, the use of voice recognition technology is advancing to simplify the input to such a system; however, the CRM system often divides the types of the input items into selection type and numerical type for the purpose of smooth customer management, such that in many cases, the utterance voice is converted into the text by voice recognition technology, but there is a technical problem that it takes time and effort to input only the necessary information according to the item type. In addition, there is a need to speak during the period while going out as a suitable usage for the voice input by mobile.

The input assistance system 1 according to the first embodiment can solve the above-mentioned technical problem and needs, and it is possible to easily input the voice of the sales staff of the own company to the CRM system.

As described above, the input assistance system 1 according to the first embodiment takes in the information of the input items of the CRM system and the result of voice recognition with respect to the voice of the own company sales staff, selects the items assuming the data registration to the CRM system, and removes the filler such as the voiced pause or the like. The voice recognition result is displayed on the display screen of the terminal device 11, and the item can be input by the operation of the user.

By using the input assistance system 1 according to the first embodiment, it is possible for the sales staff to easily input to the CRM system by voice during the period while going out.

Application Example

In an example to which the input assistance system 1 according to the first embodiment is applied, a business report is made by voice from a smartphone functioning as the terminal device 11 to an agent AI (artificial intelligence) functioning as the voice recognition unit 12A.

By using the input assistance system 1 according to the first embodiment, it is possible to reduce the load on reporting such as sales and maintenance work and promote work style reform.

The report contents can be registered in the CRM system by the voice input from the smartphone. By using the input assistance system 1 according to the first embodiment, it is possible to provide a cloud service that can collectively register a plurality of the input contents by voice such that it becomes possible to make business reports and operation reports utilizing the travel time and improve the number of reports in a timely manner.

Since the input assistance system 1 according to the first embodiment has the filler removing function, it becomes possible to perform the voice input in natural language (speaking style) so as to simplify the input.

It is possible to utilize the travel time of the user of the input assistance system 1 according to the first embodiment, and it is possible to perform the reports in a timely manner.

Second Embodiment

Hereinafter, a second embodiment of the input assistance system, the input assistance method, and the non-volatile recording medium storing program according to the present disclosure will be described.

The input assistance system 1 according to the second embodiment is configured in the same manner as the input assistance system 1 according to the first embodiment described above, except for the points described below. Accordingly, according to the input assistance system 1 of the second embodiment, the same effect as that of the input assistance system 1 according to the first embodiment described above can be obtained except for the points described later.

In the input assistance system 1 according to the first embodiment, the input item information acquisition unit 11A acquires the input item information from the CRM system (see FIG. 4). In the input assistance system 1 according to the second embodiment, the input item information acquisition unit 11A acquires the input item information from a configuration other than the CRM system.

That is, the input assistance system 1 according to the second embodiment is used for the purpose other than maintaining the relationship with the customer (such as input of long-term care record, information transmission at the time of emergency transportation, or the like).

Modification Example

When one or multiple text data among the divided text data (speech balloons shown in FIG. 2 and FIG. 3) is specified, the inputtable item activation unit 11F of the terminal device 11 performs the activation (activates) of the input items that can be input. The association between the specified text data and the input item may be, for example, not only the input type but also a keyword, the content of the specified text data, and the like. For example, in a case in which the keyword related to a place such as a "specific company name" and "place name" or the like is included in the specified text data, the input item "visit place" is activated. By providing a configuration with a function of understanding the context such as the AI or the like, it is possible to activate the input item matching the context of the specified text data, or activate the corresponding input item by comparing the content that has already been input with the specified text data.

In the input assistance system 1, the report template (input item information) in which a plurality of input items for inputting the text data are combined is prepared in advance, and the corresponding template may be selected based on the content of the text data.

In a case of creating multiple reports, it is possible create one report at one time. That is, once the input is completed and stored for one report, it is possible to input the next report.

Alternatively, a plurality of reports may be created at the same time simultaneously. That is, if the divided text data (speech balloon) is specified without storing, it is possible to read out the corresponding report based on the content of the text data and the input becomes possible.

As a mechanism to read out the corresponding report, for example, the input items required for the report are added from the keywords, context and the like of the specified text data (speech balloon) or the appropriate report template is called out, in a case in which there are multiple reports being created, it is possible to identify the corresponding report from the keywords, context and the like of specified text data.

According to at least one embodiment described above, the input assistance system 1 is the input assistance system 1 including the terminal device 11, and includes the utterance voice data acquisition unit 11C, the voice recognition unit 12A, the input item display unit 11B, the recognition result display unit 11D, and the input item selection operation reception unit 11G. The utterance voice data acquisition unit 11C acquires the utterance voice data indicating the utterance voice of the user. The voice recognition unit 12A voice-recognizes the utterance voice data acquired by the utterance voice data acquisition unit 11C and generates the text data. The input item display unit 11B displays the plurality of input items including the input item associated with the text data generated by the voice recognition unit 12A. The recognition result display unit 11D displays the text data generated by the voice recognition unit 12A as the recognition result by the voice recognition unit 12A. The input item selection operation reception unit 11G accepts the operation of selecting the input item associated with the text data displayed by the recognition result display unit 11D from the plurality of input items displayed by the input item display unit 11B. The input item display unit 11B displays the plurality of input items on a part of the display screen of the terminal device 11, and the recognition result display unit 11D displays the text data on another other part of the display screen of the terminal device 11. The input item selection operation reception unit 11G accepts the operation for selecting the input item associated with the text data in the state in which the input item display unit 11B displays the plurality of input items and the recognition result display unit 11D displays the text data. Accordingly, it is possible to improve the simplicity of the input operation.

At least a part of the functions of the input assistance system 1 according to the above-described embodiment (including the modification) may be realized by a computer. In that case, a program for realizing this function may be recorded on a computer-readable recording medium, and the function may be realized by reading and executing the program recorded on the recording medium by a computer system. The term "computer system" as used herein includes hardware such as an OS and peripheral devices and the like. The "computer-readable recording medium" is a portable medium such as a flexible disk, a magneto-optical disk, a ROM, a CD-ROM, a DVD-ROM, or a USB memory, or a storage device such as a hard disk built in a computer system. Furthermore, the "computer-readable recording medium" may include the configuration dynamically holding the program for a short period of time such as a communication line in the case of transmitting the program via a network such as the Internet or the like or the communication line such as a telephone line, and the "computer-readable recording medium" may also include the configuration holding the program for a certain period of time such as a volatile memory provided inside the computer system that is a server or a client in that case. Furthermore, the above-mentioned program may be a configuration for realizing a part of the above-mentioned functions, and may be the configuration for realizing the above-mentioned functions in combination with a program already recorded in the computer system.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An input assistance system, comprising:

a terminal device including a display screen; and an input assistance device comprising:

one or more memories that store one or more sets of processor-executable instructions;

one or more hardware processors configured to execute the one or more sets of processor-executable instructions to cause the one or more hardware processors to:

acquire utterance voice data indicating utterance voice of a user;

perform voice recognition of the utterance voice data acquired to generate text data;

display, on the display screen, a plurality of input items including the input item that is associated with the text data generated;

display, on the display screen, a recognition result by performing the voice recognition with respect to the text data generated; and accept an operation of selecting the input item associated with the text data displayed on the display screen from the plurality of input items displayed on the display screen, wherein displaying the plurality of input items comprises displaying the plurality of input items in a first part of the display screen of the terminal device, wherein displaying the recognition result comprises displaying the text data generated in a second part of the display screen of the terminal device, and accepting the operation of selecting the input item comprises accepting the operation of selecting the input item associated with the text data generated, while displaying the plurality of input items and displaying the text data generated, wherein in a case in which a silent section is included in the utterance voice of the user that is indicated by the utterance voice data acquired, pre-silent-section text data is generated, which is the text data corresponding to a part before the silent section in the utterance voice data that is acquired and post-silent-section text data that is the text data corresponding to a part after the silent section in the utterance voice data that is acquired, the pre-silent-section text data and the post-silent-section text data generated are displayed on the display screen, and the one or more hardware processors further cause to accept an operation of selecting text data associated with the input item selected by the operation accepted from the pre-silent-section text data and the post-silent-section text data displayed on the display screen.

2. The input assistance system according to claim 1, wherein the one or more hardware processors is configured to execute the one or more sets of processor-executable instructions to cause the one or more hardware processors further to activate display of a candidate input item that is the input item being able to associate with the text data that is selected by the operation accepted among the plurality of input items displayed on the display screen.

3. The input assistance system according to claim 1, wherein the one or more hardware processors is configured to execute the one or more sets of processor-executable instructions further to cause the one or more hardware processors to activate processing of executing an association of the text data selected by the operation accepted and the input item selected by the operation accepted, and to include the text data selected by the operation accepted into a display field of the input item selected by the operation accepted.

4. The input assistance system according to claim 3, wherein the one or more hardware processors is configured to execute the one or more sets of processor-executable instructions further to cause the one or more hardware processors to activate the text data corresponding to a filler included in the utterance voice of the user indicated by the utterance voice data acquired, to display, on the display screen, pre-filler-removing text data that is the text data before the text data corresponding to the filler is removed, and to execute processing of including post-filler-removing text data that is the text data after the text data corresponding to the filler is removed in the display field of the input item that is selected by the operation accepted.

5. An input assistance method using at least a terminal device including a display screen, the method to be performed by one or more hardware processors configured to execute one or more sets of processor-executable instructions to cause the one or more hardware processors, the method comprising:

acquiring utterance voice data indicating utterance voice of a user;

performing voice recognition of the utterance voice data acquired during acquiring the utterance voice data to generate text data;

displaying, on the display screen, a plurality of input items including the input item that is associated with the text data generated during performing the voice recognition;

displaying recognition result during the voice recognition with respect to the text data generated; and accepting an operation of selecting the input item associated with the text data displayed, on the display screen, during displaying the recognition result from the plurality of input items displayed, on the display screen, during displaying the input item, wherein in displaying the input item, the plurality of input items are displayed in a first part of the display screen of the terminal device, in displaying the recognition result, the text data generated during the voice recognition is displayed in a second part of the display screen of the terminal device, and in operating the input item selecting, an operation of selecting the input item associated with the text data generated during the performing voice recognition is accepted in a state in which the plurality of input items are displayed on the display screen, and the text data generated during performing the voice recognition is displayed on the display screen, wherein in a case in which a silent section is included in the utterance voice of the user that is indicated by the utterance voice data acquired, pre-silent-section text data is generated, which is the text data corresponding to a part before the silent section in the utterance voice data that is acquired and post-silent-section text data that is the text data corresponding to a part after the silent section in the utterance voice data that is acquired, the pre-silent-section text data and the post-silent-section text data generated are displayed on the display screen, and an operation is accepted of selecting text data associated with the input item selected by the operation accepted from the pre-silent-section text data and the post-silent-section text data displayed on the display screen.

6. A non-transitory computer readable storage medium that stores one or more sets of processor-executable instructions which are executable by one or more hardware processors, the one or more sets of processor-executable instructions that when executed by the one or more hardware processors cause the one or more hardware processors to perform:

acquiring utterance voice data indicating utterance voice of a user;

performing voice recognition of the utterance voice data acquired during acquiring the utterance voice data to generate text data;

displaying, on a display screen of a terminal device, a plurality of input items including the input item that is associated with the text data generated during performing the voice recognition;

displaying recognition result during performing the voice recognition with respect to the text data generated; and accepting an operation of selecting the input item associated with the text data displayed, on the display screen, during displaying the recognition result from the plurality of input items displayed, on the display screen, during displaying the input item, wherein in displaying the input item, the plurality of input items are displayed in a first part of the display screen of the terminal device, in displaying the recognition result, the text data generated during the voice recognition is displayed in a second part of the display screen of the terminal device, and in operating the input item selecting, an operation of selecting the input item associated with the text data generated during the performing voice recognition is accepted in a state in which the plurality of input items are displayed on the display screen and the text data generated during performing the voice recognition is displayed on the display screen, wherein in a case in which a silent section is included in the utterance voice of the user that is indicated by the utterance voice data acquired, pre-silent-section text data is generated, which is the text data corresponding to a part before the silent section in the utterance voice data that is acquired and post-silent-section text data that is the text data corresponding to a part after the silent section in the utterance voice data that is acquired, the pre-silent-section text data and the post-silent-section text data generated are displayed on the display screen, and an operation is accepted of selecting text data associated with the input item selected by the operation accepted from the pre-silent-section text data and the post-silent-section text data displayed on the display screen.

* * * * *